(12) United States Patent
Kurosaki (10) Patent No.: US 7,349,095 B2
(45) Date of Patent: Mar. 25, 2008

(54) LIGHT SOURCE APPARATUS AND PROJECTION APPARATUS

(75) Inventor: Hideyuki Kurosaki, Akishima (JP)

(73) Assignee: Casio Computer Co., Ltd., Tokyo (JP)

( * ) Notice: Subject to any disclaimer, the term of this patent is extended or adjusted under 35 U.S.C. 154(b) by 124 days.

(21) Appl. No.: 11/418,349

(22) Filed: May 4, 2006

(65) Prior Publication Data

US 2006/0262283 A1 Nov. 23, 2006

(30) Foreign Application Priority Data

May 19, 2005 (JP) ............................. 2005-146890

(51) Int. Cl.
*G01N 21/55* (2006.01)

(52) U.S. Cl. ..................................... 356/445; 362/235

(58) Field of Classification Search .................. 353/94; 356/445; 362/235, 227, 245, 240, 243, 231, 362/230, 560, 355, 234

See application file for complete search history.

(56) References Cited

U.S. PATENT DOCUMENTS

2006/0268546 A1* 11/2006 Kurosaki .................... 362/235

FOREIGN PATENT DOCUMENTS

JP 2003-262795 A 9/2003

* cited by examiner

*Primary Examiner*—Gregory J. Toatley, Jr.
*Assistant Examiner*—Tri Ton
(74) *Attorney, Agent, or Firm*—Frishauf, Holtz, Goodman & Chick, P.C.

(57) ABSTRACT

A light source apparatus is provided with a prismoidal light source housing having a first inclined surface formed of a dichroic mirror which transmits light of a wavelength less than 600 nm and reflects light of a wavelength of 600 nm or more, a second inclined surface opposed to the first inclined surface and formed of a dichroic mirror which transmits light of a wavelength of 600 nm or more and reflects a light of a wavelength less than 600 nm, green LEDs and blue LEDs are arranged on an external surface of the first inclined surface, and red LEDs which are arranged on an external surface of the second inclined surface.

20 Claims, 5 Drawing Sheets

LIGHT SOURCE APPARATUS AND PROJECTION APPARATUS

CROSS-REFERENCE TO RELATED APPLICATIONS

This application is based upon and claims the benefit of priority from prior Japanese Patent Application No. 2005-146890, filed May 19, 2005, the entire contents of which are incorporated herein by reference.

BACKGROUND OF THE INVENTION

The present invention relates to a light source apparatus and a projection apparatus, in particular suitable for a projector apparatus adopting DLP (Registered Trademark) method.

In prior art, projector apparatuses using a discharge lamp such as an ultra-high voltage mercury lamp as a light source are mainstream of projector apparatuses. However, such projector apparatuses have many problems in cost and usability. For example, they consume a large amount of electric power, radiate much heat and causes noises in great deal for cooling. Further, they easily deteriorate despite their expensive prices if their temperatures are not appropriately controlled by proper cooling, and their lives become short.

On the other hand, in recent years, LEDs (Light-emitting diode) having high brightness, which are solid light-emitting elements and emit light with RGB (red, green or blue) color, have widely become commercially practical. Further, it has been tried to use LEDs as a light source of projector apparatuses.

However, illumination obtained by one LED is still much lower than that of the above ultra-high voltage mercury lamps and the like. To use LEDs as a light source of projector apparatuses, it is important how much LEDs can be arranged in a small space.

Figure 4:
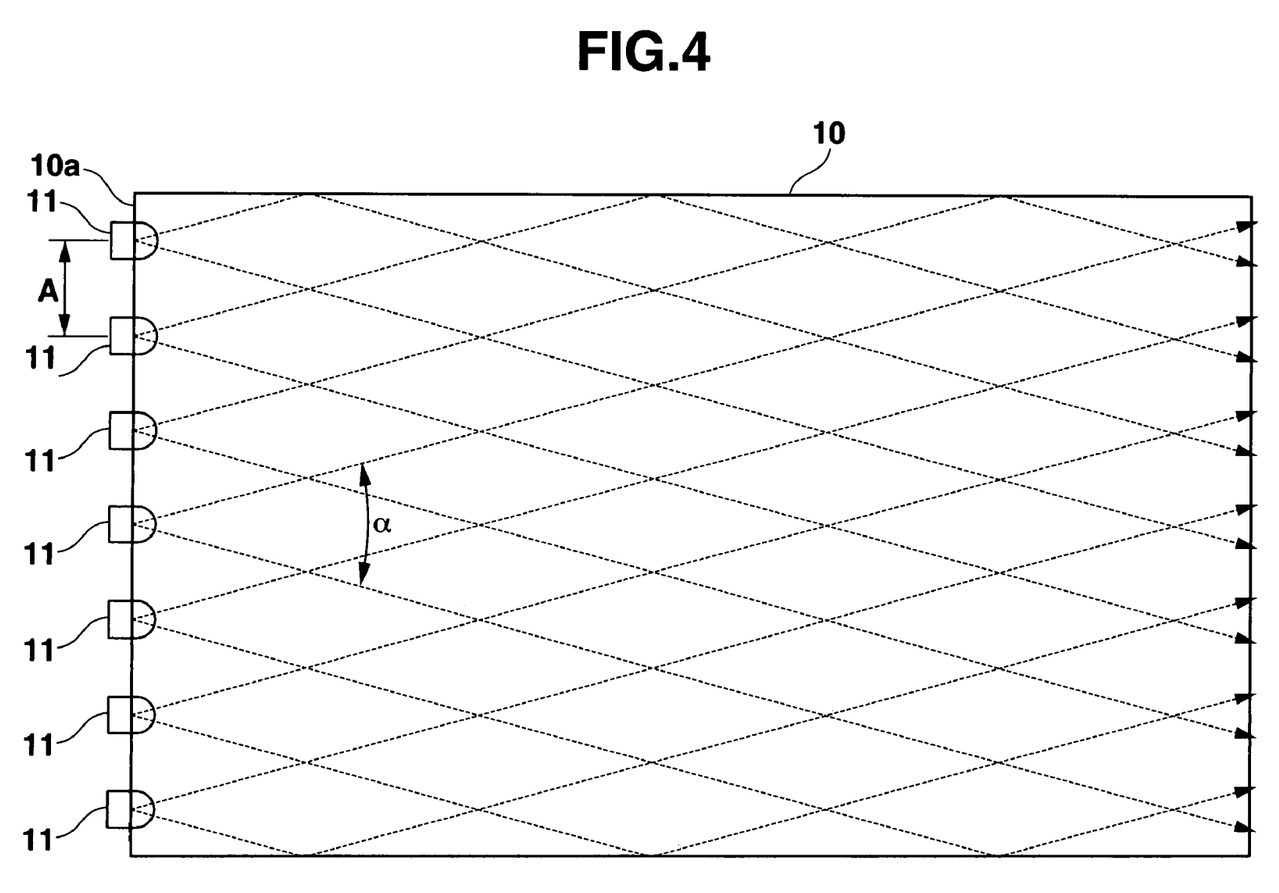
FIG. 4 is a diagram illustrating a common LED light source in which LEDs are arranged on an end surface of a light tunnel.

FIG. 4 illustrates an example in which LEDs 11 are arranged on one end surface 10a of a light tunnel 10. In this example, seven LEDs 11 are arranged with arranging pitches A on the end surface 10a.

A whole internal surface of the light tunnel 10 is a reflection mirror. Brightness distribution of light beams emitted from the respective LEDs 11 with a light-supplying angle α is uniformized when the light beams travel through the light tunnel 10 while being reflected by the internal wall of the light tunnel 10. Thereafter, the light beams are applied to a light-modulating element (not shown) such as a micromirror element to form a light image, and the light image is projected and displayed by a projection lens system.

As described above, if the LEDs 11 are simply arranged at regular intervals along a cross-section perpendicular to the optical path, the number of LEDs 11 which can be arranged are limited, and no sufficient illumination is obtained as a light source of a projector apparatus.

In the same manner, there are other techniques of forming a light source portion by arranging LEDs of RGB colors in an array form. For example, Jpn. Pat. Appln. KOKAI Pub. No. 2003-262795 discloses a technique of an illumination apparatus using a solid light source, for outputting a light of uniform light distribution with a simple structure. In this technique, used is an illumination panel having a structure wherein LED elements of RGB colors serving as light source are arranged in an array form on an entrance side of a rod lens having a reflective internal surface, to enhance use efficiency of light with a simple structure. However, the technique disclosed in Jpn. Pat. Appln. KOKAI Pub. No. 2003-262795 also has a structure in which a rectangular illumination panel corresponding to the size of the incident opening of the rod lens 20 uniformizing the brightness distribution by arranging LEDs of RGB colors in an array form. Therefore, the size of the available panel is equal to the opening size of the rod lens 20, and thus the number of LEDs which can be arranged is also limited.

With respect to this point, it is possible to arrange more LEDs and form a brighter light source apparatus, by arranging LEDs in a three-dimensional manner, not on one plane.

Figure 5:
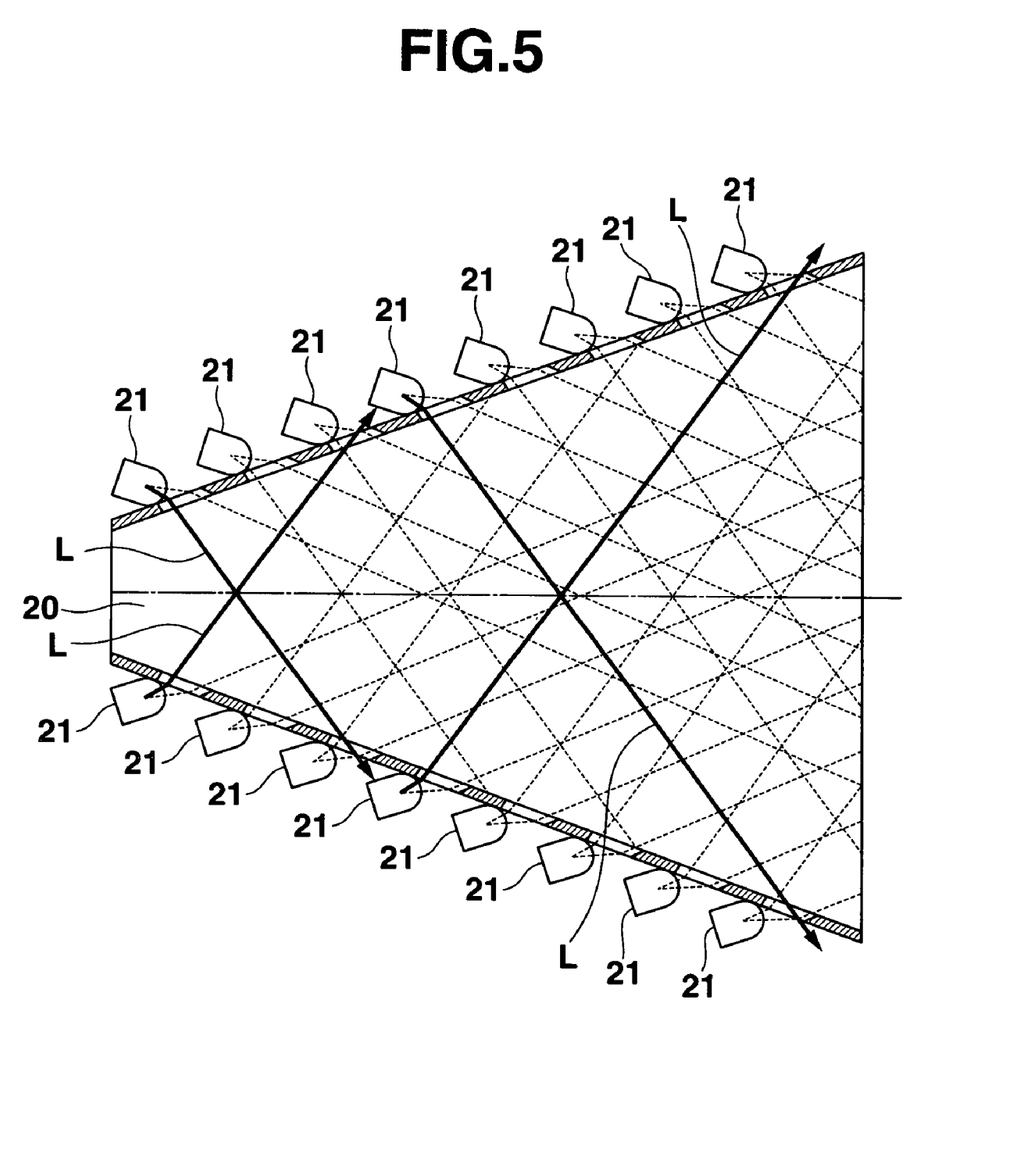
FIG. 5 is a cross-sectional view of a structural example of an LED lamp housing.

FIG. 5 illustrates a cross-sectional structure of a light source apparatus in which an opening in a lower base surface of a housing 20 having a (rectangular) prismoidal shape is used as an outgoing surface. The whole internal surface of the upper base and the whole internal surfaces of the inclined surfaces are total reflection mirrors. As shown in FIG. 5, a large number of LEDs 21 are arranged on the external surfaces of the inclined surfaces. Light beams emitted from the LEDs 21 are introduced into the housing 20 through through-holes formed in the inclined surfaces. Then, the lights outgo from the lower base surface of the housing 20 directly, or after reflected once by the internal surface of the opposing inclined surface. The irradiation ranges of the respective light beams are shown in FIG. 5.

However, the LEDs 21 provide emitted light beams to the inside of the housing 20 through through-holes formed in the inclined surfaces of the housing 20. Therefore, as shown by arrows L in FIG. 5, a part of the light beams outgoes outside the housing 20 through the through-holes for other LEDs 21 located on a part of the opposing inclined surface closer to the opening of the lower base surface, and does not serve as illumination light effective for projection.

Although the above structure enables arranging a large number of LEDs 21 which can provide a sufficient amount of light by devising the shape of the housing 20, a part of the outgoing light is leaked to the outside of the housing 20, and thus the generated light is wasted.

BRIEF SUMMARY OF THE INVENTION

A light source apparatus according to an aspect of the present invention comprises:

a pyramidal or prismoidal light source housing having a first inclined surface, a second inclined surface opposed to the first inclined surface, and a third and a fourth inclined surfaces adjacent to the first and second inclined surfaces and opposed to each other, the first inclined surface being formed of a first dichroic mirror which transmits light of a wavelength less than a predetermined wavelength and reflects light of a wavelength equal to or greater than the predetermined wavelength, the second inclined surface being formed of a second dichroic mirror which transmits light of a wavelength equal to or greater than the predetermined wavelength and reflects a light of a wavelength less than the predetermined wavelength, the third and fourth inclined surfaces each having internal surfaces formed of total reflection mirrors;

a first light-emitting element group of at least one primary color, which emit light of a wavelength less than the predetermined wavelength and are arranged on an external surface of the first inclined surface, such that the emitted light outgoes from an opening provided in a lower base surface of the light source housing directly without contacting the second inclined surface, or outgoes from the opening after being reflected once by the second inclined surface; and a second light-emitting element group of at least one primary color, which emit light of a wavelength equal to or greater than the predetermined wavelength and are arranged on an external surface of the second inclined surface, such that the emitted light outgoes from an opening provided in the lower base surface of the light source housing directly without contacting the first inclined surface, or outgoes from the opening after being reflected once by the first inclined surface.

Further, a light source apparatus according to another aspect of the present invention comprises:

a pyramidal or prismoidal light source housing having a first inclined surface formed of a first dichroic mirror which transmits light of a wavelength within a first wavelength range and reflects light of a wavelength other than the first wavelength range, a second inclined surface formed of a second dichroic mirror which transmits light of a wavelength within a second wavelength range and reflects a light of a wavelength other than the second wavelength range, a third inclined surface formed of a third dichroic mirror which transmits light of a wavelength within a third wavelength range and reflects light of a wavelength other than the third wavelength range, and a fourth inclined surface having an internal surface formed of a total reflection mirror;

a first light-emitting element group of at least one primary color, which emit light of a wavelength within the first wavelength range and are arranged on an external surface of the first inclined surface, such that the emitted light outgoes from an opening provided in a lower base surface of the light source housing directly without contacting the second inclined surface, or outgoes from the opening after being reflected once by the second inclined surface;

a second light-emitting element group of at least one primary color, which emit light of a wavelength within the second wavelength range and are arranged on an external surface of the second inclined surface, such that the emitted light outgoes from the opening provided in the lower base surface of the light source housing directly without contacting the first inclined surface, or outgoes from the opening after being reflected once by the first inclined surface; and a third light-emitting element group of at least one primary color, which emit light of a wavelength within the third wavelength range and are arranged on an external surface of the third inclined surface, such that the emitted light outgoes from the opening provided in the lower base surface of the light source housing directly without contacting the fourth inclined surface, or outgoes from the opening after being reflected once by the fourth inclined surface.

Further, a projection apparatus according to another aspect of the present invention comprises:

a light source section including a pyramidal or prismoidal light source housing having a first inclined surface, a second inclined surface opposed to the first inclined surface, and a third and a fourth inclined surfaces adjacent to the first and second inclined surfaces and opposed to each other, the first inclined surface being formed of a first dichroic mirror which transmits light of a wavelength less than a predetermined wavelength and reflects light of a wavelength equal to or greater than the predetermined wavelength, the second inclined surface being formed of a second dichroic mirror which transmits light of a wavelength equal to or greater than the predetermined wavelength and reflects a light of a wavelength less than the predetermined wavelength, the third and fourth inclined surfaces each having internal surfaces formed of total reflection mirrors, a first light-emitting element group of at least one primary color, which emit light of a wavelength less than the predetermined wavelength and are arranged on an external surface of the first inclined surface, such that the emitted light outgoes from an opening provided in a lower base surface of the light source housing directly without contacting the second inclined surface, or outgoes from the opening after being reflected once by the second inclined surface, and a second light-emitting element group of at least one primary color, which emit light of a wavelength equal to or greater than the predetermined wavelength and are arranged on an external surface of the second inclined surface, such that the emitted light outgoes from an opening provided in the lower base surface of the light source housing directly without contacting the first inclined surface, or outgoes from the opening after being reflected once by the first inclined surface;

a light emission driving section which drives the first and second light-emitting element groups to emit light for each primary color in a time division manner;

a light modulating section which forms a projection optical image by outgoing light beams from the light source housing emitted by time-division light emission driving for each primary color by the light emission driving section; and a projection section which projects the projection optical image formed by the light modulating section onto an object to which the projection optical image is to be projected.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

An embodiment of the present invention if the present invention is applied to a projector apparatus 30 is explained with reference to drawings.

Figure 1:
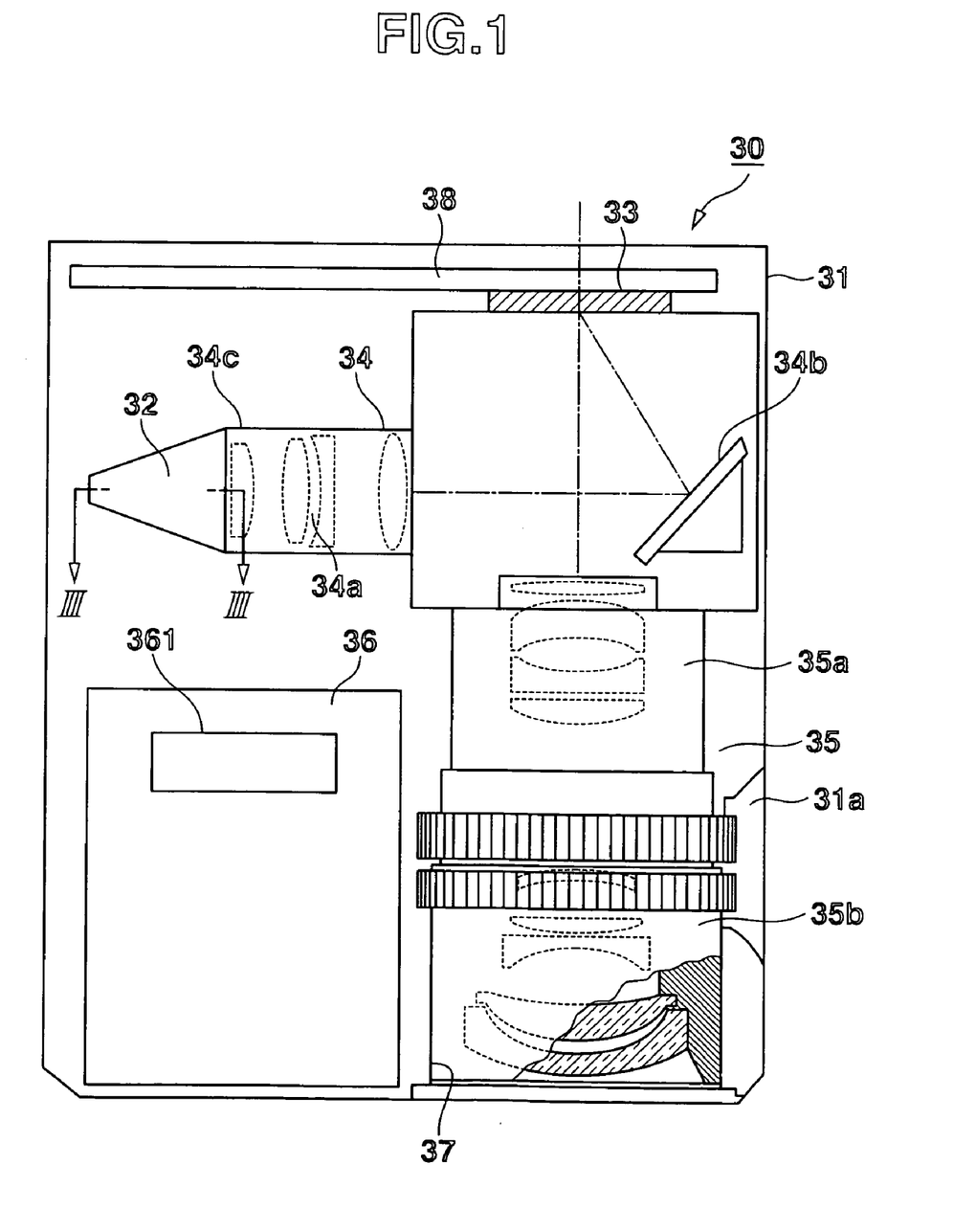
FIG. 1 is a diagram illustrating a structure inside a housing of a projector apparatus according to an embodiment of the present invention.

FIG. 1 is a cross-sectional plan view of the projector apparatus 30. The projector apparatus 30 has a structure wherein a light source apparatus 32 (light source section), a display element 33 (light modulating section), a light-source side optical system 34, and a projection lens 35 (projection section) are arranged in an inverted L shape in a projector case 31 having a rectangular shape in plan, and a power source section 36 is disposed in a remaining space in the projector case 31. The display element 33 has a display area in which a plurality of pixels are arranged in a matrix in row and column directions, and displays an image by controlling outgoing of light incident on the pixels. The light-source side optical system 34 makes the outgoing light from the light source apparatus 32 incident on the display element 33. The projection lens 35 projects the outgoing light from the display element 33 onto a projection surface of a screen (not shown). The power source section 36 includes a light emission driving section 361 that drives light emission of the light source apparatus 32.

Figure 2:
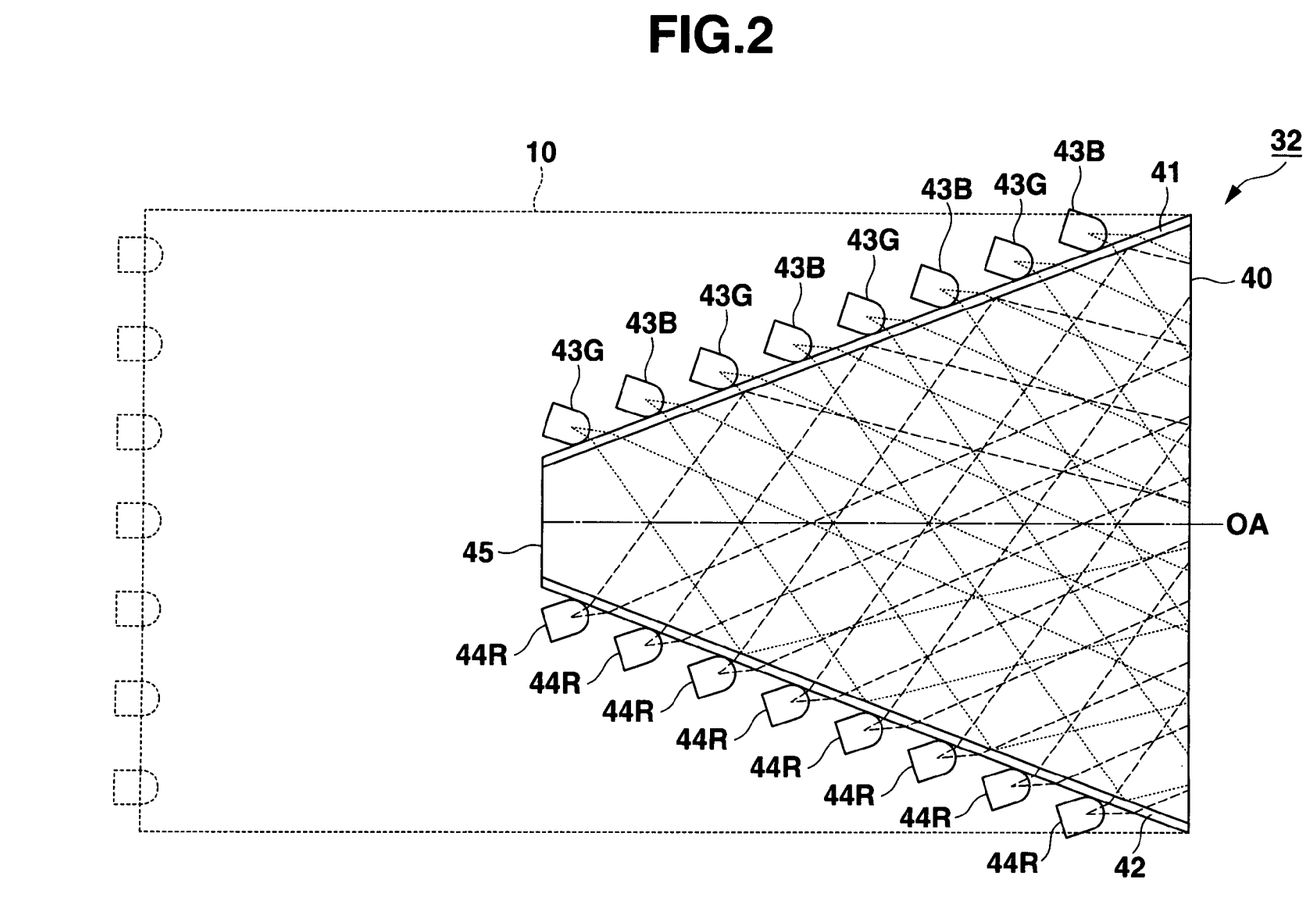
FIG. 2 is a vertical cross-sectional view of a structure of a light source apparatus taken along line II-II of FIG. 1.

Next, a specific structure of the light source apparatus 32 is explained. FIG. 2 illustrates a vertical cross-sectional structure of the light source apparatus 32, taken along line II-II of FIG. 1. FIG. 2 illustrates the size of the light source 32 in comparison with that of the light source apparatus in FIG. 4.

The light source apparatus 32 comprises a light source housing 40 having a prismoidal shape, LEDs 43G and LEDs 43B (first light-emitting element group), and LEDs 44R (second light-emitting element group). The light source housing 40 has a horizontal optical axis OA in its axial direction, and a lower base surface being a rectangular opening having an aspect ratio similar to that of projection images, for example, an aspect ratio of 3:4. The LEDs 43G and the LEDs 43B are alternately arranged and attached on an external surface of a first inclined surface 41 on the upper side of the light source housing 40. The LEDs 44R are arranged and attached on an external surface of a second inclined surface 42 on a lower side of the light source housing 40.

The first inclined surface 41 is formed of a first dichroic mirror that transmits light having a wavelength less than 600 nm and reflects light having a wavelength of 600 nm or more. The second inclined surface 42 opposing the first inclined surface 41 is formed of a second dichroic mirror that transmits light having a wavelength of 600 nm or more and reflects light having a wavelength less than 600 nm, contrary to the first dichroic mirror.

Further, whole internal surfaces of third and fourth inclined surfaces serving as side surfaces (not shown) are formed of total reflection mirrors. An upper base surface 45 is also formed of a total reflection mirror.

The LEDs 43G and the LEDs 43B attached to the first inclined surface 41 emit light with colors G (green) and B (blue), respectively, being primary colors having a wavelength less than 600 nm, such that the emitted light is transmitted through the first dichroic mirror forming the first inclined surface 41.

The light-distributing axes of the LEDs 43G and the LEDs 43B have the same angle with respect to the first inclined surface 41, and are lined up toward an opening surface of the light source housing 40. By virtue of the light-distributing angle, light emitted from each of the LEDs 43G and the LEDs 43B is transmitted through the first inclined surface 41, and then reflected by the internal surface of the opposing second inclined surface 42 by once at most directly or via the adjacent third or fourth inclined surface. Thereafter, the light outgoes from the opening of the light source housing 40, and reaches the light-source side optical system 34.

In the same manner, the LEDs 44R attached to the second inclined surface 42 emit light with color R (red) being a primary color having a wavelength of 600 nm or more, such that the emitted light is transmitted through the second dichroic mirror forming the second inclined surface 42.

The light-distributing axes of the LEDs 44R have the same angle with respect to the second inclined surface 42, and are lined up toward an opening surface of the light source housing 40. By virtue of the light-distributing angle, light emitted from each of the LEDs 44R is transmitted through the second inclined surface 42, and then reflected by the internal surface of the opposing first inclined surface 41 by once at most directly or via the adjacent third or fourth inclined surface. Thereafter, the light outgoes from the opening of the light source housing 40, and reaches the light-source side optical system 34.

The white balance of the LEDs 43G and the LEDs 43B attached onto the external surface of the first inclined surface 41 and the LEDs 44R attached onto the external surface of the second inclined surface 42 is preset as the light source apparatus, by adjusting the number of LEDs of each color according to illumination of each color, such that the total mixed color of all the LEDs becomes white.

The above display element 33 (see FIG. 1) is a display element which does not have any means for coloring incident light, such as a color filter. In this embodiment, a micromirror element, which is generally called "DMD (Digital Micromirror Device)" (registered trademark) for short, is used as the display element 33. The display element 33 is hereinafter referred to as "micromirror element 33".

The micromirror element 33, whose structure is not illustrated in drawings, has a structure wherein a plurality of pixels are formed of respective micromirrors arranged in an array, and each micromirror is moved to one inclination direction and the other inclination direction by a CMOS-based mirror driving element. Each of the micromirrors is formed of an ultrathin metal piece (such as an aluminum piece) having vertical and longitudinal widths of 10 μm to 20 μm.

The micromirror element 33 displays an image by reflecting light, which is made incident thereon from an incident direction inclined to one direction with respect to the front direction at an incident angle within a predetermined angle range, to the front direction and an oblique direction by means of switching of the inclined directions of the micromirrors. Light made incident on a micromirror inclined to one inclination direction is reflected to the front direction by the micromirror. Light made incident on a micromirror inclined to the other inclination direction is reflected to the oblique direction by the micromirror. An image is displayed by combining bright display obtained by reflection to the front direction and dark display obtained by reflection to the oblique direction.

The brightness of the bright display can be changed at discretion by controlling the time width for which the micromirror is inclined to said one inclination direction (inclination direction where incident light is reflected to the front direction). Therefore, it is possible to display an image having gradation in brightness by the micromirror element 33.

Specifically, the red LEDs 44R, the green LEDs 43G, and the blue LEDs 43B in the light source apparatus 32 are cyclically driven to emit light in a time division manner, and in synchronization with this, the micromirror element 33 produces gradation display of images corresponding to respective color components, and consequently a color image is projected and displayed.

The micromirror element 33 is provided in one side portion in the rear portion area in the projector case 31. The front portion of the micromirror element 33 faces a projection port 37 provided in one side portion of the front surface of the projector case 31.

Further, the light-source side optical system 34, which makes the outgoing light from the light source apparatus 32 incident on the micromirror element 33, includes a light-source side lens system 34a and a mirror 34B that project the outgoing light from the light source apparatus 32 toward the front surface of the micromirror element 33.

The light-source side lens system 34a is disposed in a lens supporting tube 34c connected to the outgoing opening of the light source apparatus 32. The lens center of the lens system 34a is aligned with the optical axis.

The mirror 34b of light-source side optical system 34 is formed of a plane mirror. The mirror 34b is opposed to an outgoing end of the light-source side lens system 34a with a front direction area of the micromirror element 33 interposed therebetween. Further, the mirror 34b is disposed to reflect the light outgoing from the light source apparatus 32 and having passed through the light-source side lens system 34a toward the micromirror element 33, and project the reflected light onto the micromirror element 33 from a direction inclined to one direction from the front direction thereof.

A focusing position and a zoom angle of view of the optical image formed by the micromirror element 33 are adjusted by the projection lens 35, and projected and displayed onto a screen (not shown) onto which the image is to be projected.

Specifically, the projection lens 35 includes an incident-side fixed lens tube 35a, and an outgoing-side movable lens tube 35b that is engaged with the fixed lens tube 35a and axially moved back and forth by rotary operation. A lens group formed by combining a plurality of lens elements is provided in each of the lens tubes 35a and 35b, to change the focusing position and the zoom angle of view.

The outgoing-side movable lens tube 35b of the projection lens 35 is electrically driven by a motor (not shown), but can be manually operated by the user. An opening 31a is provided in a side surface of the projector case 31, in which the projection lens is provided. The opening 31a is used for rotating and axially moving the movable lens tube 35b of the projection lens 35 by manual operation, to adjust the focus of the projection lens 35.

Further, in the projector case 31, disposed is a display/sound system circuit board 38 connected to input/output connector sections such as a USB terminal (not shown), input terminals of color image signals and sound signals, and video signal input terminals, which are provided on the rear surface of the projector case 31. The display/sound system circuit board 38 is disposed in a standing state along the rear surface portion of the projector case 31. The circuit board 38 is connected with the micromirror element 33, and the motor (not shown) that electrically drives the outgoing-side movable lens tube 35b of the projection lens 35, and the like.

In the above structure, the red LEDs 44R, the green LEDs 43G, and the blue LEDs 43B of the light source apparatus 32 are driven to emit light in a time division manner, and thereby light beams successively colored with three colors of red, green and blue are obtained. The light beams from the light source apparatus 32 are reflected by the mirror 34b of the light-source side optical system 34, and projected onto the micromirror element 33.

Primary color data of red, green and blue are successively displayed by the micromirror element 33 in synchronization with the projection periods of the light beams of red, green and blue. Thereby, optical images of primary colors of red, green and blue which successively outgo from the micromirror element 33 are enlarged by the projection lens 35, and projected onto a screen (not shown) onto which the image is to be projected. Thereby, a full-color image obtained by superposing the optical images of the three primary colors of red, green and blue is displayed on the object onto which the image is to be projected.

As described above, the light source apparatus 32 has a structure in which a pair of opposing inclined surfaces 41 and 42 of the light source housing 40 having a prismoidal shape are formed of dichroic mirrors having contrary transmission/reflection properties, and a number of LEDs 43G, 43B, and 44R that emit light with respective primary colors having corresponding wavelength properties are arranged on the inclined surfaces. This structure enables using more LEDs as light source, and using light emitted by the LEDs more effectively as projection light.

Further, in particular, the light source housing 40 of the light source apparatus 32 is formed to have a prismoidal shape, and the whole internal surface of the upper base thereof is formed of a total reflection mirror. This structure reduces the axial length of the light source apparatus 32 and makes the light source apparatus 32 compact. Further, this structure further enhances the efficiency of the light source, by utilizing slight light reaching the internal surface of the upper base, among the light emitted by the LEDs 43G, 43B and 44R being light-emitting elements.

The light source housing 40 may have a pyramidal shape, instead of prismoidal shape.

In the above embodiment, the LEDs 43G and the LEDs 43B are arranged on the first inclined surface on the upper side of the light source housing 40, and LEDs 44R are arranged on the second inclined surface on the lower side of the light source housing 40, and internal surfaces of the third and fourth inclined surfaces being side surfaces are formed of total reflection mirrors. As a modification, the following structure may be adopted. In this structure, LEDs 43B (first light-emitting element group) are arranged on the first inclined surface on the upper side of the light source housing 40, and the first inclined surface is formed of a first dichroic mirror that transmits light of a wavelength range of B (blue) and reflects light of other wavelength ranges. Further, LEDs 44R (second light-emitting element group) are arranged on the second surface on the lower side of the light source housing 40, and the second surface is formed of a second dichroic mirror that transmits light of a wavelength range of R (red) and reflects light of other wavelengths. Furthermore, LEDs 43G (third light-emitting element group) are arranged on one of third and fourth inclined surfaces being side surfaces, and the third or fourth inclined surface is formed of a third dichroic mirror that transmits light of a wavelength range of G (green) and reflects light of other wavelength ranges. The left fourth or third inclined surface having no LEDs has an internal surface formed of a total reflection mirror. According to the modification, the three colors of LEDs are attached to the respective three inclined surfaces, and thus it is possible to provide more LEDs, and utilize more light as projection light.

In the above embodiment, the light source apparatus 32 is directly connected to the light-source side optical system 34 as shown in FIG. 1. However, an optical member for uniformizing the brightness distribution may be interposed between the light source apparatus 32 and the light-source side optical system 34.

Figure 3:
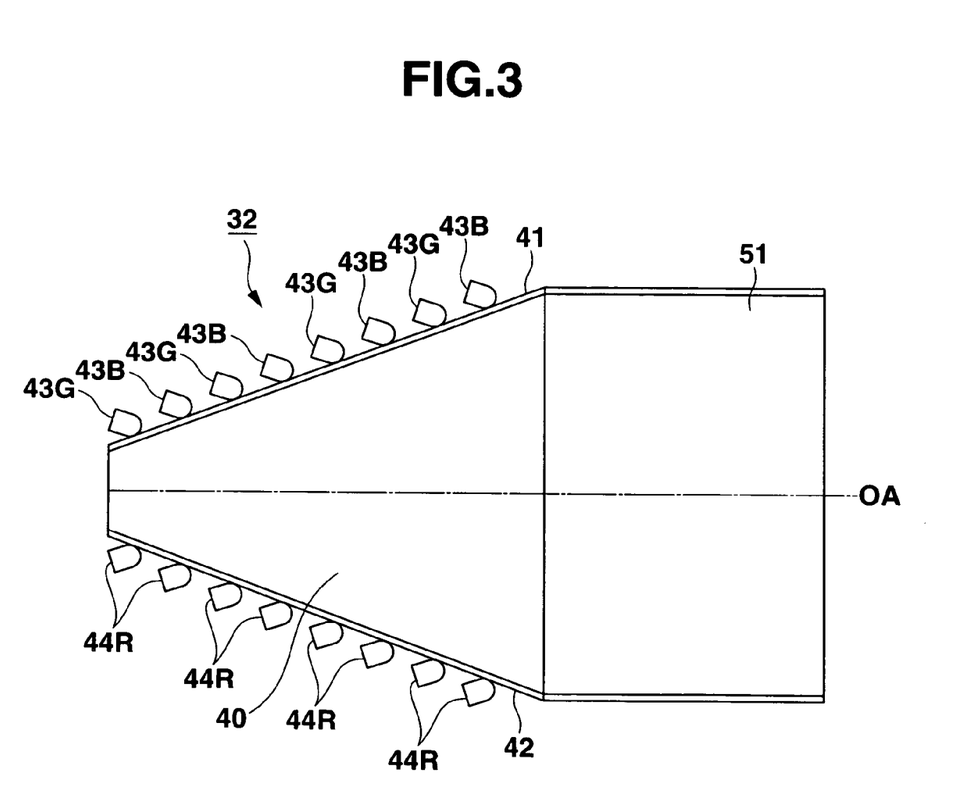
FIG. 3 is a diagram illustrating another structural example of the light source apparatus according to the embodiment.

FIG. 3 illustrates the case where a light tunnel 51 having a rectangular tube shape is disposed downstream the light source apparatus 32. In this case, the light tunnel 51 has rectangular tube shape, which has a rectangular cross section being congruent with the opening in the lower base surface of the light source housing 40 of the light source apparatus 32 and having the aspect ratio of the projection image, for example, 3:4. The whole internal surface of the light tunnel 51 is provided with a reflection film (not shown). An incident surface on which light is made incident is formed at one end of the light tunnel 51, and an outgoing surface for the light incident on the incident surface is formed on the other end.

The light tunnel 51 guides light incident on the incident surface by reflecting it with the reflection film on the internal surface of the rod, and emits light having a uniform brightness distribution from the outgoing surface. The outgoing surface of the light tunnel 51 is directly connected to the light-source side optical system 34 with their optical axes aligned.

As described above, according to the case, the light tunnel 51 is disposed to interpose between the light source apparatus 32 and the light-source side optical system 34. By virtue of this structure, even if the light emitted by the light source apparatus 32 has uneven brightness distribution in its cross section perpendicular to the optical axis thereof, the light tunnel 51 certainly uniformizes the distribution and transmits the uniformized light to the light-source side optical system 34. Therefore, the projection image obtained as a result has no unevenness in brightness distribution, and thus it is possible to achieve a projection light source with higher display quality.

Although the light tunnel 51 is explained above as a hollow rectangular tube, means for uniformizing the brightness distribution is not limited to it. For example, another optical member which is not hollow but filled with a light-transmitting member may be used. For example, it is possible to use an integrator rod, which is a rectangular tube formed of optical glass or optical plastic, and a metal film such as aluminum is deposited as a mirror surface on the peripheral surface of the tube except the incident surface and the outgoing surface thereof.

The present invention is not limited to the above embodiment, but various modifications are possible within a range not departing from the gist of the invention.

Further, the above embodiment includes invention of various stages, and various inventions can be made by combining a plurality of constituent elements disclosed therein. For example, even if some of the constituent elements are deleted from the constituent elements disclosed in the embodiment, the structure with the constituent elements deleted is extracted as an invention, if the invention solves at least one of the objects of the invention and produces at least one of the effects of the invention.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A light source apparatus, comprising:
a pyramidal or prismoidal light source housing having a first inclined surface, a second inclined surface opposed to the first inclined surface, and a third and a fourth inclined surfaces adjacent to the first and second inclined surfaces and opposed to each other, the first inclined surface being formed of a first dichroic mirror which transmits light of a wavelength less than a predetermined wavelength and reflects light of a wavelength equal to or greater than the predetermined wavelength, the second inclined surface being formed of a second dichroic mirror which transmits light of a wavelength equal to or greater than the predetermined wavelength and reflects a light of a wavelength less than the predetermined wavelength, the third and fourth inclined surfaces each having internal surfaces formed of total reflection mirrors;
a first light-emitting element group of at least one primary color, which emit light of a wavelength less than the predetermined wavelength and are arranged on an external surface of the first inclined surface, such that the emitted light outgoes from an opening provided in a lower base surface of the light source housing directly without contacting the second inclined surface, or outgoes from the opening after being reflected once by the second inclined surface; and
a second light-emitting element group of at least one primary color, which emit light of a wavelength equal to or greater than the predetermined wavelength and are arranged on an external surface of the second inclined surface, such that the emitted light outgoes from an opening provided in the lower base surface of the light source housing directly without contacting the first inclined surface, or outgoes from the opening after being reflected once by the first inclined surface.

2. A light source apparatus according to claim 1, wherein the light source housing has a prismoidal shape and an upper base internal surface formed of a total reflection mirror.

3. A light source apparatus according to claim 1, wherein an optical member which uniformizes a brightness distribution of light transmitted through the optical member is provided on the opening of the light source housing, the optical member has a rectangular tube shape and all internal peripheral wall surfaces of the optical member are formed of total reflection mirrors.

4. A light source apparatus according to claim 3, wherein the optical member is a hollow light tunnel having a rectangular tube shape.

5. A light source apparatus according to claim 3, wherein the optical member is not hollow, but filled with a light-transmitting member.

6. A light source apparatus according to claim 1, wherein the first light-emitting element group are green LEDs and blue LEDs.

7. A light source apparatus according to claim 1, wherein the second light-emitting element group are red LEDs.

8. A light source apparatus, comprising:
a pyramidal or prismoidal light source housing having a first inclined surface formed of a first dichroic mirror which transmits light of a wavelength within a first wavelength range and reflects light of a wavelength other than the first wavelength range, a second inclined surface formed of a second dichroic mirror which transmits light of a wavelength within a second wavelength range and reflects a light of a wavelength other than the second wavelength range, a third inclined surface formed of a third dichroic mirror which transmits light of a wavelength within a third wavelength range and reflects light of a wavelength other than the third wavelength range, and a fourth inclined surface having an internal surface formed of a total reflection mirror;
a first light-emitting element group of at least one primary color, which emit light of a wavelength within the first wavelength range and are arranged on an external surface of the first inclined surface, such that the emitted light outgoes from an opening provided in a lower base surface of the light source housing directly without contacting the second inclined surface, or outgoes from the opening after being reflected once by the second inclined surface;

a second light-emitting element group of at least one primary color, which emit light of a wavelength within the second wavelength range and are arranged on an external surface of the second inclined surface, such that the emitted light outgoes from the opening provided in the lower base surface of the light source housing directly without contacting the first inclined surface, or outgoes from the opening after being reflected once by the first inclined surface; and a third light-emitting element group of at least one primary color, which emit light of a wavelength within the third wavelength range and are arranged on an external surface of the third inclined surface, such that the emitted light outgoes from the opening provided in the lower base surface of the light source housing directly without contacting the fourth inclined surface, or outgoes from the opening after being reflected once by the fourth inclined surface.

9. A light source apparatus according to claim 8, wherein the light source housing has a prismoidal shape and an upper base internal surface formed of a total reflection mirror.

10. A light source apparatus according to claim 8, wherein
an optical member which uniformizes a brightness distribution of light transmitted through the optical member is provided on the opening of the light source housing, the optical member has a rectangular tube shape and all internal peripheral wall surfaces of the optical member are formed of total reflection mirrors.

11. A light source apparatus according to claim 10, wherein
the optical member is a hollow light tunnel having a rectangular tube shape.

12. A light source apparatus according to claim 10, wherein
the optical member is not hollow, but filled with a light-transmitting member.

13. A light source apparatus according to claim 8, wherein the first light-emitting element group are blue LEDs.

14. A light source apparatus according to claim 8, wherein the second light-emitting element group are red LEDs.

15. A light source apparatus according to claim 8, wherein the third light-emitting element group are green LEDs.

16. A projection apparatus, comprising:
a light source section including a pyramidal or prismoidal light source housing having a first inclined surface, a second inclined surface opposed to the first inclined surface, and a third and a fourth inclined surfaces adjacent to the first and second inclined surfaces and opposed to each other, the first inclined surface being formed of a first dichroic mirror which transmits light of a wavelength less than a predetermined wavelength and reflects light of a wavelength equal to or greater than the predetermined wavelength, the second inclined surface being formed of a second dichroic mirror which transmits light of a wavelength equal to or greater than the predetermined wavelength and reflects a light of a wavelength less than the predetermined wavelength, the third and fourth inclined surfaces each having internal surfaces formed of total reflection mirrors, a first light-emitting element group of at least one primary color, which emit light of a wavelength less than the predetermined wavelength and are arranged on an external surface of the first inclined surface, such that the emitted light outgoes from an opening provided in a lower base surface of the light source housing directly without contacting the second inclined surface, or outgoes from the opening after being reflected once by the second inclined surface, and a second light-emitting element group of at least one primary color, which emit light of a wavelength equal to or greater than the predetermined wavelength and are arranged on an external surface of the second inclined surface, such that the emitted light outgoes from an opening provided in the lower base surface of the light source housing directly without contacting the first inclined surface, or outgoes from the opening after being reflected once by the first inclined surface;

a light emission driving section which drives the first and second light-emitting element groups to emit light for each primary color in a time division manner;

a light modulating section which forms a projection optical image by outgoing light beams from the light source housing emitted by time-division light emission driving for each primary color by the light emission driving section; and a projection section which projects the projection optical image formed by the light modulating section onto an object to which the projection optical image is to be projected.

17. A projection apparatus according to claim 16, wherein the light source housing has a prismoidal shape and an upper base internal surface formed of a total reflection mirror.

18. A projection apparatus according to claim 16, wherein
an optical member which uniformizes a brightness distribution of light transmitted through the optical member is provided on the opening of the light source housing, the optical member has a rectangular tube shape and all internal peripheral wall surfaces of the optical member are formed of total reflection mirrors.

19. A projection apparatus according to claim 18, wherein the optical member is a hollow light tunnel having a rectangular tube shape.

20. A projection apparatus according to claim 18, wherein the optical member is not hollow, but filled with a light-emitting member.

* * * * *